(12) United States Patent
Röver et al.

(10) Patent No.: US 7,386,727 B1
(45) Date of Patent: Jun. 10, 2008

(54) METHOD FOR DIGITAL SIGNING OF A MESSAGE

(75) Inventors: Stefan Röver, Holzgerlingen (DE); Hans-Dieter Groffman, Hirrlingen (DE)

(73) Assignee: Encorus Holdings Limited, Dublin (IE)

( * ) Notice: Subject to any disclaimer, the term of this patent is extended or adjusted under 35 U.S.C. 154(b) by 0 days.

(21) Appl. No.: 09/530,334

(22) PCT Filed: Oct. 24, 1998

(86) PCT No.: PCT/EP98/06769

§ 371 (c)(1), (2), (4) Date: Jun. 10, 2000

(87) PCT Pub. No.: WO99/22486

PCT Pub. Date: May 6, 1999

(51) Int. Cl.
*H04L 9/00* (2006.01)
*H04K 1/00* (2006.01)
*H04M 1/66* (2006.01)

(52) U.S. Cl. ............... 713/176; 713/172; 713/182; 380/247; 380/270; 705/17; 705/18; 705/70; 455/410

(58) Field of Classification Search ........... 705/70, 705/17–18; 713/176, 172, 182; 380/247, 380/270; 235/380; 455/410
See application file for complete search history.

(56) References Cited

U.S. PATENT DOCUMENTS

| 4,405,829 A | 9/1983 | Rivest et al. | |
| 4,529,870 A | 7/1985 | Chaum | 235/380 |
| 4,679,236 A | 7/1987 | Davies | |
| 4,995,082 A | 2/1991 | Schnorr | 380/23 |
| 5,050,207 A * | 9/1991 | Hitchcock | 379/93.19 |
| 5,191,613 A | 3/1993 | Graziano et al. | |
| 5,299,262 A | 3/1994 | Brickell et al. | |
| 5,373,561 A | 12/1994 | Haber et al. | 380/49 |
| 5,416,842 A | 5/1995 | Aziz | 380/30 |
| 5,440,633 A | 8/1995 | Augustine et al. | 380/23 |
| 5,455,863 A | 10/1995 | Brown et al. | 380/23 |
| 5,511,121 A | 4/1996 | Yacobi | |

(Continued)

FOREIGN PATENT DOCUMENTS

CH     683 052     12/1993

(Continued)

OTHER PUBLICATIONS

Dan Brown, Techniques for Privacy and Authentication in Personal Communication Systems, Aug. 1995, IEEE Personal Communications.*

(Continued)

*Primary Examiner*—Minh Dieu Nguyen
(74) *Attorney, Agent, or Firm*—Molly Kocialski; Armstrong Teasdale LLP

(57) ABSTRACT

A method and apparatus for the digital signing of a message to be signed, the message to be signed is transmitted via a communication network to a mobile radio telephone to be used as a signing unit. A message to be signed is transmitted from a transmitter to a receiver and then from the receiver to the mobile radio telephone via a telephone network. The mobile radio telephone user indicates that the message to be signed should be signed, and the mobile radio telephone generates a signed message. The signed message is then transmitted from the mobile radio telephone to the receiver and from the receiver to an addressee.

28 Claims, 3 Drawing Sheets

U.S. PATENT DOCUMENTS

Figure 1:
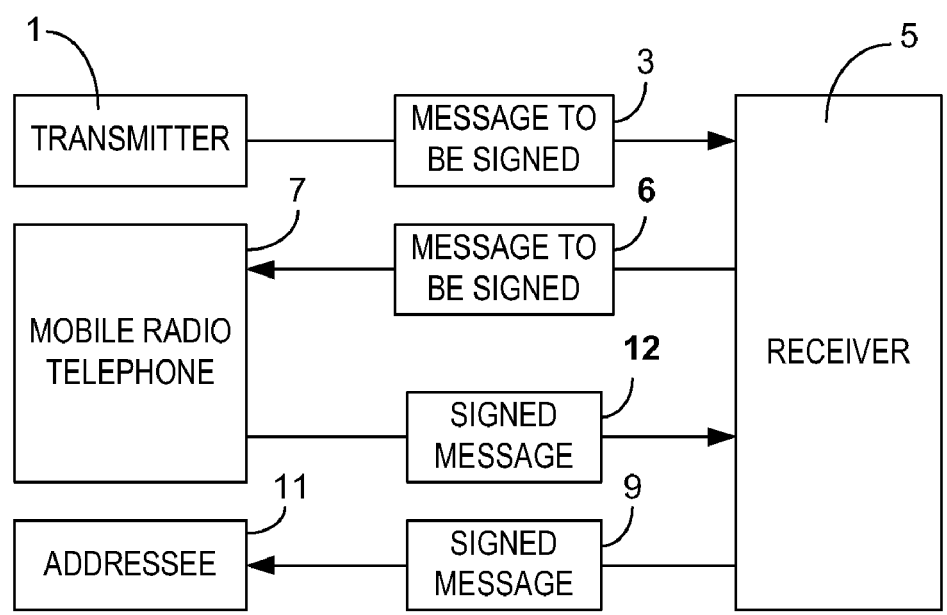

| | | | |
|---|---|---|---|
| 5,524,052 A | 6/1996 | Augustine et al. | 380/49 |
| 5,544,255 A | 8/1996 | Smithies et al. | |
| 5,546,463 A | 8/1996 | Caputo et al. | |
| 5,548,106 A | 8/1996 | Liang et al. | 235/454 |
| 5,613,012 A | 3/1997 | Hoffman et al. | |
| 5,621,797 A | 4/1997 | Rosen | 380/24 |
| 5,623,637 A | 4/1997 | Jones et al. | 395/491 |
| 5,629,982 A | 5/1997 | Micali | 380/30 |
| 5,647,017 A | 7/1997 | Smithies et al. | |
| 5,668,876 A | 9/1997 | Falk et al. | |
| 5,724,423 A | 3/1998 | Khello | 380/23 |
| 5,724,425 A | 3/1998 | Chang et al. | |
| 5,778,071 A | 7/1998 | Caputo et al. | |
| 5,784,464 A | 7/1998 | Akiyama et al. | |
| 5,787,175 A | 7/1998 | Carter | |
| 5,796,832 A * | 8/1998 | Kawan | 705/65 |
| 5,799,086 A | 8/1998 | Sudia | |
| 5,805,719 A | 9/1998 | Pare, Jr. et al. | |
| 5,809,145 A | 9/1998 | Slik et al. | |
| 5,818,955 A | 10/1998 | Smithies et al. | |
| 5,838,812 A | 11/1998 | Pare, Jr. et al. | |
| 5,862,325 A | 1/1999 | Reed et al. | |
| 5,872,848 A * | 2/1999 | Romney et al. | 713/176 |
| 5,872,849 A | 2/1999 | Sudia et al. | |
| 5,875,404 A | 2/1999 | Messiet | 455/558 |
| 5,878,142 A | 3/1999 | Caputo et al. | |
| 5,886,333 A * | 3/1999 | Miyake | 235/380 |
| 5,903,880 A | 5/1999 | Biffar | |
| 5,909,491 A * | 6/1999 | Luo | 380/270 |
| 5,917,913 A | 6/1999 | Wang | 380/25 |
| 5,943,423 A | 8/1999 | Muftic | |
| 5,948,103 A | 9/1999 | Fukuzaki | |
| 5,960,085 A | 9/1999 | de la Huerga | |
| 6,009,177 A | 12/1999 | Sudia | |
| 6,018,724 A | 1/2000 | Arent | |
| 6,038,549 A | 3/2000 | Davis et al. | |
| 6,041,314 A | 3/2000 | Davis | |
| 6,047,269 A | 4/2000 | Biffar | |
| 6,055,236 A | 4/2000 | Nessett et al. | |
| 6,061,791 A | 5/2000 | Moreau | |
| 6,064,751 A | 5/2000 | Smithies et al. | |
| 6,085,320 A | 7/2000 | Kaliski, Jr. | |
| 6,088,717 A | 7/2000 | Reed et al. | |
| 6,091,835 A | 7/2000 | Smithies et al. | |
| 6,105,006 A | 8/2000 | Davis et al. | |
| 6,115,601 A * | 9/2000 | Ferreira | 455/406 |
| 6,142,369 A * | 11/2000 | Jonstromer | 235/380 |
| 6,148,405 A | 11/2000 | Liao et al. | |
| 6,157,920 A | 12/2000 | Jakobsson et al. | |
| 6,175,922 B1 | 1/2001 | Wang | 713/182 |
| 6,189,098 B1 | 2/2001 | Kaliski, Jr. | |
| 6,205,435 B1 | 3/2001 | Biffar | |
| 6,213,391 B1 | 4/2001 | Lewis | |
| 6,223,291 B1 | 4/2001 | Puhl et al. | |
| 6,240,091 B1 | 5/2001 | Ginzboorg et al. | |
| 6,243,480 B1 | 6/2001 | Zhao et al. | |
| 6,282,522 B1 | 8/2001 | Davis et al. | |
| 6,311,167 B1 | 10/2001 | Davis et al. | |
| 6,314,468 B1 | 11/2001 | Murphy et al. | |
| 6,314,519 B1 | 11/2001 | Davis et al. | |
| 6,325,292 B1 | 12/2001 | Sehr | |
| 6,332,133 B1 | 12/2001 | Takayama | |
| 6,367,013 B1 | 4/2002 | Bisbee et al. | |
| 6,381,344 B1 | 4/2002 | Smithies et al. | |
| 6,394,341 B1 | 5/2002 | Makipaa et al. | |
| 6,397,261 B1 | 5/2002 | Eldridge et al. | |
| 6,404,337 B1 | 6/2002 | Van Till et al. | |
| 6,490,367 B1 | 12/2002 | Carlsson et al. | |
| 7,043,456 B2 | 5/2006 | Lindskog et al. | |
| 2005/0250471 A1 * | 11/2005 | Philipeit | 455/410 |

FOREIGN PATENT DOCUMENTS

| | | |
|---|---|---|
| DE | 42 01 197 A1 | 7/1993 |
| DE | 43 33 388 A1 | 4/1995 |
| DE | 44 06 590 A1 | 9/1995 |
| DE | 44 06 602 A1 | 9/1995 |
| DE | 44 20 967 A1 | 12/1995 |
| DE | 37 04 814 C2 | 5/1996 |
| DE | 195 48 581 A1 | 7/1997 |
| DE | 196 09 232 A1 | 9/1997 |
| DE | 297 17 520 U1 | 11/1997 |
| DE | 42 01 197 C2 | 1/1998 |
| DE | 196 18 471 A1 | 1/1998 |
| DE | 43 35 317 C2 | 2/1998 |
| DE | 196 34 418 A1 | 3/1998 |
| DE | 197 24 901 A1 | 12/1998 |
| DE | 197 47 603 | 5/1999 |
| DE | 198 44 677 | 2/2000 |
| DE | 100 49 164 A1 | 4/2002 |
| EP | 0 689 316 A2 | 12/1995 |
| EP | 0689316 A | 12/1995 |
| EP | 0 555 992 | 9/1996 |
| EP | 0 481 714 | 1/1997 |
| EP | 0 777 394 A1 | 4/1997 |
| EP | 0777394 A1 | 4/1997 |
| EP | 0 562 890 | 6/2000 |
| FI | 945075 A1 | 4/1996 |
| JP | 3-1629 | 3/1991 |
| JP | 6-501571 | 6/1994 |
| JP | 8-511144 | 8/1996 |
| SE | 467559 | 8/1992 |
| WO | WO 90/13213 | 11/1990 |
| WO | WO 92/03000 | 2/1992 |
| WO | WO 92/14329 | 8/1992 |
| WO | WO 93/26131 | 12/1993 |
| WO | WO 94/08433 | 12/1993 |
| WO | WO 94/11849 | 5/1994 |
| WO | WO 95/19593 | 7/1995 |
| WO | WO 95/23465 | 8/1995 |
| WO | WO 95/35635 | 12/1995 |
| WO | WO 96/03830 | 2/1996 |
| WO | WO 96/13814 | 5/1996 |
| WO | WO 96/32700 | 10/1996 |
| WO | WO9632700 A | 10/1996 |
| WO | WO 97/37461 | 10/1997 |
| WO | WO9737461 A | 10/1997 |
| WO | WO 00/52866 | 9/2000 |

OTHER PUBLICATIONS

International Search Report.

Einfuhrung In Die Din-Normen.

Rankl/Effing: Handbook Smart Cards, Verlag John Wiley and Sons Ltd, 1997, ISBN 0 471 96720 3.

Draft prETS 300901 (GSM 03.40 version 5.5.0, Mai 1997), ETSI, Digital Cellular telecommunications sytem (Phase 2+); Technical realization of the (SMS); (PP).

Pfitzmann et al.: Mobile User Devices and Security Modules: Design for Trustworthiness; IBM Research Division, Research Report RZ 2784 (#89262) Feb. 3, 1996.

Der HBCI-Standard- Was bedeutet "HBCI (Home Banking Computer Interface)"! An English synopsis of the document is included.

Micheli, Uwe; Sicherheitsfunktionen im paneuropaischen Mobilfunknetz, DeTeCon Deutsche Telepost Consulting GmbH, Einfuhrungsveranstaltung vom Oct. 8-Oct. 11, 1991. An English synopsis of the document is included.

"RSA [Rivest, Shamir and Adelman algorithm] Enters Wireless Arena," Jan. 12, 1994, Redwood City, CA.

"Motorola to Apply RSA Technology to Family of Information Security Products for Worldwide Communication of Senstive Data," Oct. 16, 1995, Redwood City, CA.

"Unwired Planet Chooses RSA Technology for Wireless Internet Platform," Jul. 8, 1997, Redwood City, CA.

Rott, Christian; E-Cash: Stocktaking, Student of the economical informatics for the practical course from experimental Economics, Jan. 1998, Vienna. An English translation of the document is included.

Murch, Allan; Stiffe, Peter; "Cellular Data Services over GSM" Microwave Journal, USA, vol. 38, No. 7, Jul. 1995, ISSN 0026-2897, p. 90, 92, 94, 96 XP000524891.

Irlbeck, Thomas: "Digital Signature," Computer-Lexikon, Beck EDV Consultants A-Z. An English translation of the document is included.

Digital Cellular Telecommunications System (Phase 2+); Technical realization of the Short Message Service (SMS); Point-to-Point (PP) (GSM 03.40).

Pfitzmann, Andreas; Pfitzmann, Birgit; Schunter, Matthias; Waidner, Michael; Mobile User Devices and Security Modules: Design for Trustworthiness, Feb. 5, 1996.

Elgamal, Taher; "A Public Key Cryptosystem and a Signature Scheme Based on Discrete Logorithms," Jul. 1985, IEEE Transaction Information Theory; 1985 vol. IT31 pp. 469-472.

Chaum, David; Fiat, Amos; Naor, Moni; "Untraceable Electronic Cash" Session 9, Protocols, University of Montreal, pp. 319-327.

Donn, Ivan; "Smart Cards in GSM," Electron, Feb. 1994.

Grigorova, Theodora; Leung, Ivan; "SIM Cards," Telecommunication Journal of Australia, vol. 43, No. 2, 1993 AU, pp. 33-38.

Herold, Von Sven; "Hintergrund: Was ist HBCI?," May 10, 2001, ZDF.MSNBC. An English synopsis of this document is included.

Lukas, Sylvia; "Cyber Money—Kunstliches Geld in Internet und Elektronischen Geldborsen," pp. 122-123, 1997, Hermann Luchterhand Verlag, Neuwied, Kriftel/Ts., Berlin. An English synopsis of the document is included.

Volpe, Frances P.; Volpe, Safinaz; "Chipkarten," pp. 62-65, Verlag Heinz Heise GmbH & Co KG, Hannover. An English synopsis of the document is included.

Horster, Patrick; "Trust Center," pp. 1-9, 154-157, 1995, Friedr, Vieweg & Sohn Verlagsgesellschaft mbH, Braunschweig/Wiesbaden, 1995. An English synopsis of the document is included.

Bellare, Mihir; Garay, Juan A.; Hauser, Ralf; Herzberg, Amir; Krawcyzk, Hugo; Tsudik, Gene; Waidner, Michael; "iKP—A Family of Secure Electronic Payment Protocols," Aug. 2, 1995.

An English translation of a portion of FI 945075 (cite FY).

An English translation of a portion of DE 4406590 (cite FA).

An English translation of a portion of DE 19609232 (cite FB).

An English translation of a portion of DE 3704814 (cite FC).

An English translation of a portion of DE 19548581 (cite FE).

An English translation of a portion of DE 19634418 (cite FG).

An English translation of a portion of DE 19618471 (cite FH).

An English translation of a portion of DE 4333388 (cite FI).

An English translation of a portion of DE 4201197 (cite FJ).

An English translation of a portion of DE 19844677 (cite FL).

An English translation of a portion of DE 10049164 (cite FM).

An English translation of a portion of DE 19747603 (cite FO).

An English translation of a portion of WO 95/35635 (cite FP).

An English translation of WO 93/26131 (cite FQ).

An English translation of WO 94/08433 (cite FR).

An English translation of WO 94/11849 (cite FS).

An English translation of WO 90/13213 (cite FT).

An English translation of WO 92/14329 (cite FU).

An English translation of EP 0555992 (cite FV).

An English translation of EP 0562890 (cite FW).

An English translation of EP 0481714 (cite FX).

An English translation of a portion of CH 683052 (cite FZ).

An English translation of a portion of SE 467559 (cite FAA).

An English translation of WO 96/13814 (cite FAB).

An English translation of EP 0777394 (cite FAC).

An English translation of a portion of DE 29717520 (cite FF).

An English translation of a portion of DE 4335317 (cite FK).

An English translation of a portion of DE 4420967 (cite FN).

Grounds for the Decision, Nov. 27, 2006, 12 pages, European Patent Office.

Communication/Minutes, Nov. 27, 2006, 10 pages, European Patent Office.

Der HBCI-Standard- Was bedeutet "HBCI (Home Banking Computer Interface)"? An English synopsis of the document is included, 1995.

Irlbeck, Thomas; "Digital Signature," Computer-Lexikon, Beck EDV Consultants A-Z. An English translation of the document is included, 1998.

Digital Cellular Telecommunications System (Phase 2+); Technical realization of the Short Message Service (SMS); Point-to-Point (PP) (GSM 03.40), Oct. 1996.

Chaum, David; Fiat, Amos; Naor, Moni; "Untraceable Electronic Cash" Session 9, Protocols, University of Montreal, pp. 319-327, 1990.

* cited by examiner

METHOD FOR DIGITAL SIGNING OF A MESSAGE

The present invention relates to a process for the digital signing of a message and to a system required for practising this process.

Digital signatures, ie., electronic signatures, are usually made with the aid of so-called public-key processes. In these processes, to the signer there is assigned a pair of keys which consist of a secret key and a public key. A signature is generated by means of the secret key with a mathematical algorithm, and this signature can be verified with the associated public key. The secret key can be controlled only by the signer so that nobody is able to sign in the name of the signer. The public key, by contrast, may be published so that anybody can verify the signature. The secret key is usually protected through a PIN so that for making a signature, knowledge of the PIN and possession of the secret key are required.

Digital signatures can be generated in a computer, eg., in a PC, with the aid of software programs. The associated secret key is usually stored on a hard disk or a diskette and downloaded into the main memory for generating the signature. In most instances, the secret key proper is, in turn, stored in encoded form and protected via a PIN which the owner has to input when signing via the software. This is to ensure that only the owner of the secret key can use the same for signing. Since no additional hardware is required, this process is advantageous in regard to costs. It turns out to be a shortcoming that the user must rely on the signature software's integrity and that the same is not deemed sufficiently safe.

Hardware-based processes are an alternative for generating digital signatures in a computer. These processes for signing make use of special systems in which the display component and the keyboard are coupled with the signature component by hardware in a way such that the connection cannot be influenced. These systems are usually connected to the computer via a galvanic connection, eg., a cable to the serial interface. These systems have their own display component which displays the message to be signed, and their own keyboard, the so-called PIN pad through which the PIN is inputted for making the key available. The secret key is usually not stored in the signing unit but rather on a chipcard which can be introduced into the system. The signature proper can be generated on the chipcard (in the case of chipcards with incorporated cryptoprocessor) or in the system. The above-described hardware-based process forms a closed signing system consisting of the display component, the keyboard, the reader, and the chip card.

Hardware-based processes are significantly safer than software-based processes but their costs are higher. Accordingly, so-called hybrid processes are used at the present time. In these, the secret keys are in most cases stored on a chipcard and made available via a reader instrument. The other tasks, such as display, inputting of the PIN, and signature generation are fully or partially carried out in the computer. It may be provided that the signature unit, ie., the reader and the chipcard, is used as a pure storage medium for the secret key, whereas the display, the inputting of the PIN, and the generation of the signature are entirely carried out in the computer.

It can be provided as an alternative to effect the display and the inputting of the PIN through the computer; in this case, the signing unit is used for signature generation, in addition to storing the secret key. Finally, there exists a version in which only the display is effected in the computer. In this version, the signing unit has its own keyboard or it is directly connected with the computer keyboard under exclusion of the computer software. The signature is generated in the signing unit. This process is the more cost-saving the fewer tasks must be carried out by the computer software and the lower the performance requirements to the signing unit.

WO 96/32700 discloses a process in which a message generated in a mobile radio telephone is signed digitally and passed on. EP 0 689 316 A2 discloses a process and a system for identifying and verifying data in a communication network.

However, in all this embodiments there is the basic problem that there must be signed precisely the data which the user wants to sign. It must be precluded that a virus affects the data, for example during the transmission from the display component, eg., from the display, to the signing component, eg., the cryptoprocessor. Furthermore, it must be ensured that a secret number (eg., the PIN), which is required to trigger signatures, cannot be read from the keyboard by other programs and does not become known to third parties.

Furthermore, the large-scale utlisation of the option of digital signing is limited by the comparatively small distribution of signing units. In fields of the potential application of digital signatures, eg., in internet banking, therefore a costly infrastructure would have to be set up to spread the use of signing units. Also the installation of signing units at the computer is problematic. On the one hand, the units must be physically connected to the computer, yet all the serial interfaces of a PC are often already in use. Alternative processes for incorporating signing units in computers are likewise problematic, since for this purpose software drivers and, sometimes, even additional hardware are required. Apart from this, for all signing units there must be implemented special software components which allow the application program to communicate with the signing unit.

A further problem of the conventional processes for digital signatures results from the fact that they are location-dependent. Particular fields of application of digital signatures, eg., internet banking, are location-independent in view of the everywhere accessible public internet terminals. If these internet banking applications were combined with the known location-dependent processes for digital signing, independence of the location would be lost in these applications.

A low-cost, easy-to-build, and location-independent process for the digital signing of communications and the provision of appropriate means are the technological problems underlying the present invention.

These technological problems are solved through the teachings according to the main claim. Thus, the invention creates a process for digital signing of a message by means of a signing unit, which message is to be transmitted to a receiver, with the message to be signed being transmitted from a transmitter to a receiver, this message thereafter being transmitted from the receiver via a telephone network, particularly the mobile radio telephone network, to a signing unit associated with the transmitter, this message then being signed in the signing unit and retransmitted, as signed message, to the receiver. In a particularly preferred embodiment of the invention, the signing unit is a mobile radio telephone and, accordingly, the mobile radio phone network is the telephone network.

In the context of the present invention, digital signing of a message is understood as a procedure in which the intent to deliver a message and its contents are confirmed electronically. This is effected by partial or full encoding of the message to be signed or by encoding of a cryptographic check sum of this message into a signed message by means of a secret key and by making use of an algorithm. In the context of the present invention, a signed message is understood either as the message as a whole or as the signature proper. Signing serves for being able to identify the user later on. In the context of the present invention, a signed message is understood also as merely the electronically generated signature of the message. In the context of the present invention, a message is understood as any kind of electronically reproducible information, for example, numbers, characters, combinations of numbers, combinations of characters, graphs, tables, etc. In the context of the present invention, a signing unit is understood as a unit which can perform the signing of the message, ie., which comprises a secret key, a mathematical encoding procedure, facilities for dialog with the signer or user, optionally the required interfaces, and a transmitting and receiving system. This unit can be composed of various elements, for example, of a chipcard and a reader or a chipcard and a mobile radio telephone. In the context of the present invention, signing means are understood as a component of the signing unit, including the secret key and/or the encoding procedure and/or an interface with the two or one of the aforementioned components.

Based on the—according to the invention particularly preferred—use of the radio telephone net for transmitting messages to be signed to a signing unit, which, in an advantageous embodiment is a mobile radio telephone, it is possible to transmit messages to the signing unit from a commercial computer having a connection to an appropriate message server, eg., by e-mail, without need for implementing or modifying anything at the computer.

In a particularly preferred embodiment, the invention envisages a process of the above-identified type in which the message to be signed is transmitted, from a transmitter to be termed a message source, eg., a PC, to a receiver, eg., a message server, in which this message is thereafter transmitted from the receiver to a signing unit associated with the transmitter, particularly to a mobile radio telephone, with this message thereafter signed in the mobile radio telephone and retransmitted to the receiver as signature, ie., as signed message.

Thus, the invention provides that an unsigned message or a message to be signed is transmitted from a message source to a receiver, for example, to a message server. Then the receiver associates the message to be signed with the signing unit, particularly with the mobile radio telephone. This is effected either via documentation stored in the receiver or via information which, together with the message to be signed, was transmitted from the transmitter to the receiver. The association of the signing unit, advantageously of the mobile radio telephone, with the message source therefore need not be a spacewise localised association but is an association purely through information. The association involves the determination of the signing unit and, hence, of the user who has to sign the received message to be signed. The mobile radio telephone which is used in the preferred embodiment of the invention can advantageously display a message to be signed and, when instructed by the user, can effect the signing with the aid of the advantageously employed chipcard. The message signed in this way is transmitted to the receiver and there optionally compared with the original message and identified as authentic. The signed message, which is optionally identified as authentic, is then transferred to an addressee.

The invention also relates to an above-indicated process in which it is provided in advantageous fashion to use a public-key process for signing, wherein the transmitter has an associated secret key and the receiver has a corresponding public key associated with the secret key. This procedure has the advantage of not necessitating the transmission of the keys.

In a further advantageous embodiment, the invention relates to an above-indicated process in which the message to be signed, or the previously signed message, ie., for example, the signature, is transmitted between the receiver and the signing unit, particularly the mobile radio telephone, by means of short-message service (SMS). In a particularly preferred embodiment, it can be provided that both the transmission of the message to be signed from the receiver to the mobile radio telephone and the transmission of the signed message or of the signature from the mobile radio telephone to the receiver are carried out by SMS.

In a further embodiment, the invention provides that the message to be signed is displayed by means of a display provided in the mobile radio telephone. This can be the display of conventional mobile radio telephones. In this way, simple texts, such as, for example, banking transactions or even simple graphs, can be readily displayed.

Following this optionally provided display, the user gives an appropriate instruction in a corresponding dialog for triggering the signing operation. In a particularly preferred embodiment, the invention provides a process of the above-indicated type in which the secret key required for signing is stored in a chipcard of the mobile radio telephone and in which this key is activated by means of a secret number (termed PIN in what follows) capable of being inputted from the key pad of the mobile radio telephone. By corresponding appropriate programming of the mobile radio telephone it can be ensured in advantageous fashion that the inputted PIN is transmitted only to the chipcard and cannot be recognised from the outside.

In a further alternative embodiment of the aforementioned process according to the invention, it is provided to input the secret key required for signing via the key pad of the mobile radio telephone.

It is provided in a further preferred embodiment of the invention that in one of the aforementioned processes, the secret key is stored not only on the chipcard of the mobile radio telephone but that there also the signing of the message is effected. In this way it is ensured in advantageous fashion that the secret key does in no event leave the chipcard and therefore cannot be used by unauthorised persons.

It is provided in a further preferred embodiment of the invention that the mobile radio telephone is used not only for signing the message but, in addition, as the sender for transmitting the signed message to the receiver.

The invention also relates to means for practising the aforementioned processes, particularly mobile radio telephones and chipcards.

In a further preferred embodiment of the invention there is provided a mobile radio telephone which comprises a key pad, display means, and chipcard means for reading and/or writing of a chipcard adapted to be inserted into the mobile radio telephone, wherein there are provided, in addition, signing means which are suitable, for example, for communicating with a chipcard according to the invention and/or for generating a signed message from a message to be signed. The signing means are advantageously connected with the key pad for inputting a secret key or a PIN.

In a particularly advantageous embodiment of the aforementioned mobile radio telephone, it is provided that the signing means represent a software component at variance with the conventional software component of a mobile radio telephone. In a preferred embodiment of the invention, this modified software component is suitable for carrying out the signing of the message after dialog with the user. In a further embodiment, the modified software component, which is provided according to the invention, is advantageously capable of communicating with the chipcard according to the invention for carrying out the signing according to the invention. It is provided in a particularly advantageous embodiment of the invention that the signing means of the signing unit can work with additional algorithms which facilitate the display of the message to be signed on the display field of the mobile radio telephone.

Thus, the present invention in particularly advantageous fashion makes available a system in which only the software components have to be modified relative to the conventionally employed software components. No modification of the hardware is required.

In a further embodiment of the invention, the invention also relates to the chipcard for mobile radio telephones, particularly for the aforementioned mobile radio telephones, wherein the chipcard comprises signing means capable of storing the secret key of the user. Advantageously, the signing means of the chip card are additionally capable of generating a signed message from a message received by the mobile radio telephone, ie., from a message to be signed. In the context of the present invention, the signing means of a chipcard according to the invention are understood as means which store the secret key of the user and, in an advantageous embodiment, also carry out the signing. The signing need not be carried out directly on the chip card but can be effected by a software component and/or hardware component in the mobile radio telephone.

Other advantageous embodiments of the invention will become obvious from the dependent claims.

The invention will be explained in detail with reference to the figures and the associated exemplary embodiment.

Figure 2:
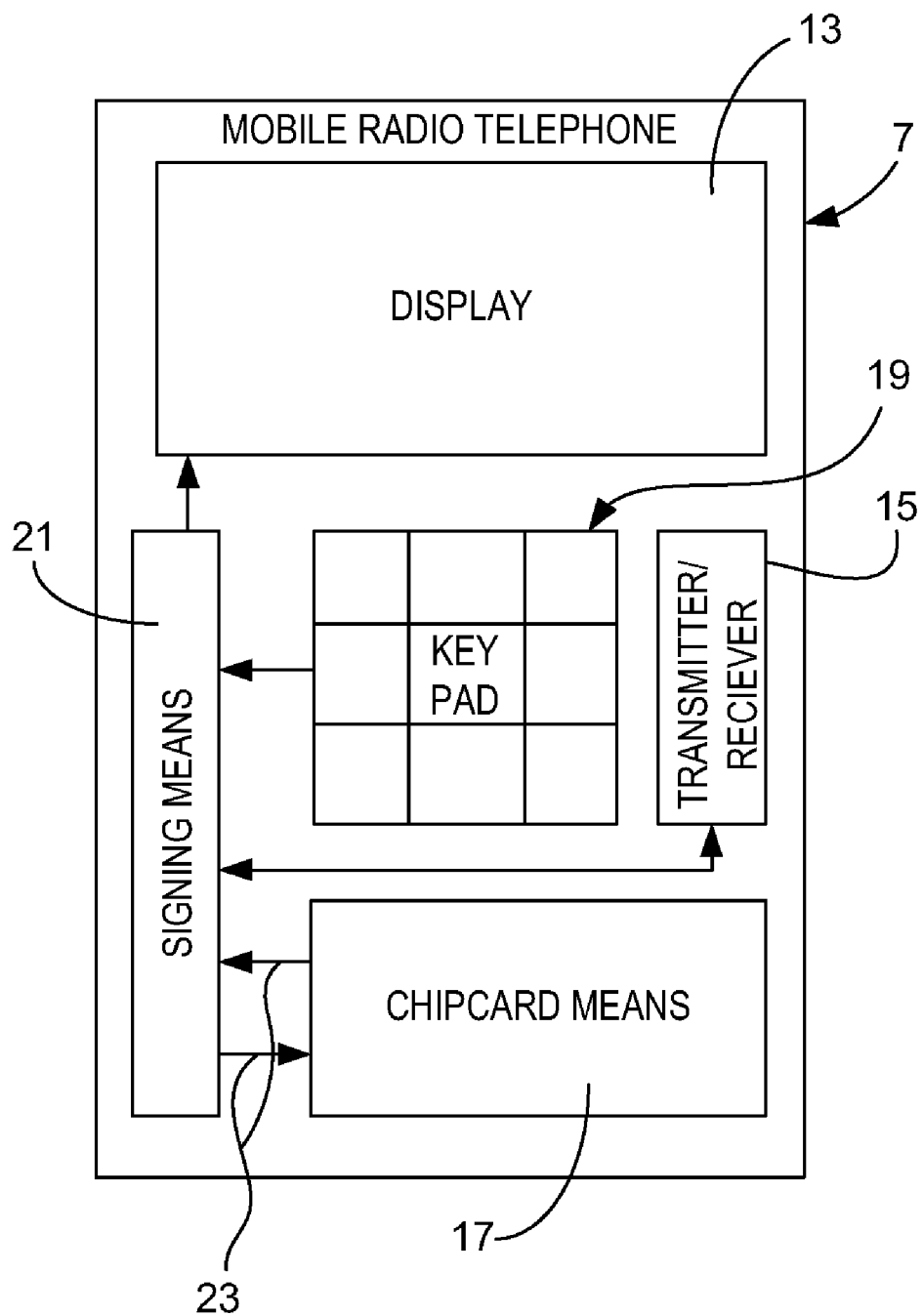
Figure 3:
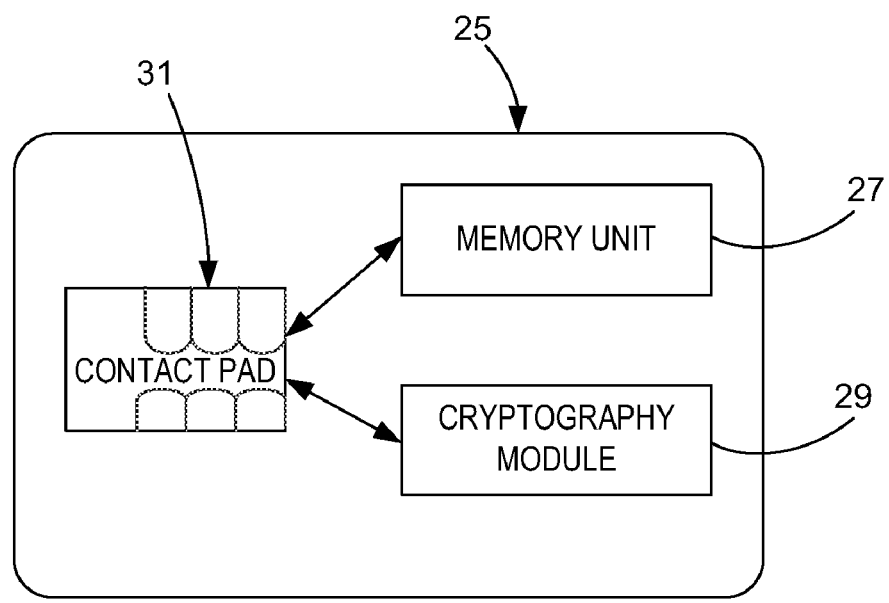

The figures show:

FIG. 1, the operational sequence of the process according to the invention;

FIG. 2, the schematic structure of a mobile radio telephone according to the invention; and FIG. 3, a schematic representation of a chip card according to the invention.

FIG. 1 shows the transmitter 1 which can be configured as a PC having a text editor or a home banking program, a message 3 to be signed, a receiver 5 which is configured as a message server, a mobile radio telephone 7, a signed message 9, and an addressee 11.

A message 3 to be signed is sent, eg., by e-mail, to the receiver 5 with the aid of the home banking program incorporated in the transmitter 1. The receiver 5 converts the received message, which is to be signed, into a message 6 which can be sent to the mobile radio telephone 7, particularly by means of a mobile-phone radio net, and though SMS, in an advantageous embodiment. The receiver 5 associates the message 3 to be signed with the mobile radio telephone 7, for example by means of data stored in the receiver 5. It may also be provided that the association is effected by means of data sent by the transmitter 1 together with the message to be signed. These data are, in general, the phone number of the mobile radio telephone.

The received message 6 is displayed in the mobile radio telephone 7 on a display 13. The precise operation will be explained in detail in the description pertaining to FIG. 2. After displaying the message 6 to be signed on the display 13, the message 6 to be signed is being signed upon instruction by the user and the signed message 9 is passed on to the receiver 5 or to some other receiver. Transmission of the signed message 9 from the mobile radio telephone 7 to the receiver 5 is likewise effected though SMS. The receiver 5 is capable of comparing the signed message 9 with the original message 3 to be signed and transmit it thereafter to an addressee 11 as a signed message 12. Transmission to the addressee 11 can be carried out in any form.

FIG. 2 illustrates a mobile radio telephone 7. The mobile radio telephone 7 comprises a display 13, a transmitter/receiver 15, chipcard means 17, a key pad 19, and signing means 21.

The message 6 to be signed, which is transmitted from the receiver 5, is received by the transmitter/receiver 15 of the mobile radio telephone 7 and, if necessary, passed on in modified form to the signing means 21. The signing means 21 take care of the internal control of the signing operation. The signing means 21 comprise software components for controlling the display 13 so that the message 6 to be signed can be made visible. Furthermore, the message 6 to be signed is signed within the signing means 21. In order to be able to carry out the signing operation, the signing means 21 must communicate with the chipcard means 17. Furthermore, it is necessary that the secret key proper or the PIN is inputted to the signing means 21 via the key pad. If the PIN, which is usually shorter, ie., which has fewer digits than the secret key, is inputted by the user via the key pad 19, the PIN can—so to speak—activate the unwieldy secret key for the signing operation by means of the operating system of the chipcard 25. The signing means 21 can communicate with the chipcard 25 via a bidirectional connection line 23. The chipcard means 17 ensure that the commands of the signing means 21 are executed and that the signed message 9 is passed on to the transmitter/receiver 15 via the signing means 21. This means that the chipcard means 17 form an interface between the signing means 21 and the chipcard 25.

FIG. 3 shows—in very simplified, schematic form—a chipcard 25 according to the invention. It comprises basically a contact pad 31, a memory unit 27, and a cryptography module 29. The secret key required for generating the signed message 9 is stored in the memory unit 27. The cryptography module 29 serves for encoding the message 6 to be signed, for example, by means of an RSA process. The memory unit 27 or the cryptography module 29 can communicate with the chipcard 25 via the contact pad 31. Other elements required for the operation of the chipcard 25, eg., a controller, are not shown in FIG. 3 for the sake of clarity of the representation.

The invention claimed is:

1. A method for digital signing of a message which is transmitted via a communication network to a signing unit, comprising:

initiating a transmission from a transmitter external to a network, the network including a first receiver and a mobile radio telephone, a message to be signed to the first receiver;

transmitting the message to be signed from the first receiver via a telephone network to the mobile radio telephone comprising a signing unit, the telephone network comprising a mobile radio telephone network, the mobile radio telephone associated with the telephone network;

signing the message to be signed via the mobile radio telephone, thereby forming a signed message, the signed message signifying a user's intent to deliver the signed message and its content;

transmitting the signed message to the first receiver or at least one other receiver; and communicating the signed message to an addressee.

2. The method according to claim 1, wherein a public-key process is used for signing, particularly a public-key process in which said signing unit has an associated secret key and, in particular, the receiver has a corresponding public key so that the signed message transmitted to the receiver can, optionally, be compared with the original message and identified as authentic.

3. The method according to claim 2, wherein the secret key required for signing is inputted via keyboard on the mobile radio telephone.

4. The method according to claim 2, wherein the secret key required for signing is stored on a chip card of the mobile radio telephone, the secret key being activated by a personal identification number (PIN) adapted to be inputted via a keyboard on the mobile radio telephone.

5. The method according to claim 4, wherein the chip card performs said signing step.

6. The method according to claim 4, wherein the mobile radio telephone performs said signing step and wherein the secret key is read from the chip card.

7. The method according to claim 1, wherein the message to be signed is transmitted between the receiver and the mobile radio telephone by means of a short-message service (SMS).

8. The method according to claim 1, wherein, prior to signing, the message to be signed is displayed by means of a display provided in the mobile radio telephone.

9. The method according to claim 1, wherein a signed message is created.

10. A method for digitally signing, by means of a signing apparatus, a message to be transmitted to a receiving device, characterized in that the message to be signed is initiated to be transmitted from a transmitting device external to a network, the network including the receiving device and the signing apparatus, to the receiving device, this message is then transmitted from the receiving device via a telephone network to the signing apparatus associated with the transmitting device, this message is then signed in the signing apparatus and transmitted back to the receiving device as a signed message.

11. The method according to claim 10, wherein the signing apparatus is a mobile telephone.

12. The method according to claim 11, wherein the telephone network is a mobile telephone network.

13. The method according to claim 12, wherein the messages between the receiving device and the mobile telephone are transmitted by means of a short message service (SMS).

14. The method according to claim 10, wherein a public key process is used for signing, especially a public key process in which the signing apparatus has a private key allocated to it and the receiving device has the corresponding public key associated with the private key.

15. The method according to claim 14, wherein the private key necessary for the signing is input via a keypad device of the signing apparatus.

16. The method according to claim 10, wherein the message is represented before signing by means of a display device provided in the signing apparatus.

17. The method according to claim 10, wherein the private key necessary for the signing is deposited in a chip card of the signing apparatus, and the private key is enabled by means of a private number (PIN) which can be input via a keypad device of the signing apparatus.

18. The method according to claim 17, wherein the chip card generates the signed message.

19. The method according to claim 17, wherein the signing apparatus generates the signed message and wherein the private key is read from the chip card.

20. The method according to claim 10, wherein the signing apparatus serves in addition as a transmitter to transmit the signed message to the receiving device.

21. A chip card for a mobile telephone, wherein the chip card incorporates a signing device which has a memory unit for storing a private key necessary for producing a signed message, characterized in that the signing device generates the signed message from a message to be signed, which is initiated from a transmitter external to a network, the network including a first receiver and the mobile telephone, which is received by the mobile telephone via a telephone network.

22. A method for transport via a communication network of a message to a mobile phone and transport of a corresponding signed message, said method comprising:

initiating a transmission from a transmitter external to a network, the network including a first receiver and a mobile radio telephone, a message to be signed to the first receiver;

transmitting the message to be signed from the first receiver via a telephone network to the mobile radio telephone whereat the message to be signed may be signed, and when signed, generates a corresponding signed message;

transmitting the corresponding signed message from the mobile radio telephone to the first receiver or at least one other receiver; and communicating the corresponding signed message to an addressee.

23. The method of claim 22, wherein a public key process with a secret key and a public key is used, the secret key being used to produce a signed message and the receiver optionally using the public key to authenticate the signed message, said authentication being done by obtaining the message to be signed from the signed message for comparison to the original message to be signed that was sent to the mobile radio telephone.

24. The method of claim 22, wherein the message to be signed is transmitted between the receiver and the mobile radio telephone by means of a short message service (SMS).

25. The method of claim 22, wherein the receiver provides a gateway function for interoperability between a protocol for the transmitting from a transmitter a message to be signed to a receiver and a protocol for the transmitting the message to be signed from the receiver via a telephone network to a mobile radio telephone.

26. The method of claim 22, wherein the at least one receiver provides a gateway function for interoperability between a protocol for transmitting the corresponding signed message from the mobile radio telephone to the some other receiver and a protocol for the communicating the corresponding signed message to an addressee.

27. A method, comprising:

a mobile radio telephone user receiving a message from a telephone network, the message being initiated from a transmitter external to a network, the network including a first receiver and a mobile radio telephone;

the user using the mobile radio telephone to generate a signed message corresponding to the received message; and the user initiating transmission of the signed message via the use of the mobile radio telephone into the telephone network so as to communicate the signed message to an addressee.

28. The method of claim 27, wherein the generating of a corresponding signed message employs a secret key of a public key process to produce the signed message.

* * * * *